United States Patent
Raghavan

(10) Patent No.: US 8,781,452 B2
(45) Date of Patent: Jul. 15, 2014

(54) WIRELESS DEVICES AND METHODS OF OPERATING WIRELESS DEVICES BASED ON THE PRESENCE OF ANOTHER PERSON

(75) Inventor: Krishnan Raghavan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 446 days.

(21) Appl. No.: 13/031,418

(22) Filed: Feb. 21, 2011

(65) Prior Publication Data

US 2012/0214461 A1  Aug. 23, 2012

(51) Int. Cl.
  *H04M 3/42* (2006.01)
  *H04B 7/00* (2006.01)
  *H04M 3/00* (2006.01)
  *H04M 11/00* (2006.01)
  *H04M 1/725* (2006.01)

(52) U.S. Cl.
  CPC ........ *H04M 3/42365* (2013.01); *H04M 1/7253* (2013.01); *H04M 1/72569* (2013.01); *H04M 2207/18* (2013.01); *H04M 1/72558* (2013.01); *H04M 1/72572* (2013.01)
  USPC .......... 455/415; 455/41.2; 455/418; 455/419; 455/420; 455/518; 455/519; 379/93.23

(58) Field of Classification Search
  CPC ........................................................ H04M 3/42
  USPC ......................................................... 455/415
  See application file for complete search history.

(56) References Cited

U.S. PATENT DOCUMENTS

| | | | |
|---|---|---|---|
| 7,636,779 B2 | 12/2009 | Hayashi et al. | |
| 2005/0136837 A1* | 6/2005 | Nurminen et al. | 455/41.2 |
| 2006/0052091 A1* | 3/2006 | Onyon et al. | 455/415 |
| 2008/0307341 A1 | 12/2008 | Ferry et al. | |
| 2009/0311999 A1 | 12/2009 | Sarkar et al. | |
| 2010/0076926 A1* | 3/2010 | Lecciso et al. | 707/610 |
| 2010/0097310 A1* | 4/2010 | Lee et al. | 345/156 |
| 2010/0151887 A1 | 6/2010 | Bobier | |
| 2010/0255822 A1 | 10/2010 | Celik | |

* cited by examiner

*Primary Examiner* — Huy C Ho

(57) ABSTRACT

A method of operating a device for a user is provided. The method includes operating the device in a first mode; receiving an indication of a first person in the presence of the user; retrieving a first profile associated with the first person; and operating the device in a second mode based, at least in part, on the first profile.

17 Claims, 4 Drawing Sheets

WIRELESS DEVICES AND METHODS OF OPERATING WIRELESS DEVICES BASED ON THE PRESENCE OF ANOTHER PERSON

TECHNICAL FIELD

The present invention relates generally to wireless devices and more particularly to wireless devices operated based on another person in the presence of the user.

BACKGROUND

Wireless communication devices are gaining in popularity and functionality and have become an integral part of the present day world. Such devices may include portable computers, cellular telephones and smart phones and perform a number of functions, including receiving emails and other messages and playing audio and video content.

With the use of wireless devices increasing, the opportunities for a wireless device to interrupt a personal meeting of the user are also increasing. For example, a wireless device typically rings when the user is receiving a phone call, which is undesirable when the user is meeting with certain people, such as a client, spouse, or boss. Conventionally, wireless devices have adjustable settings for turning off such notifications, but adjusting these settings for each personal meeting may be inconvenient and prone to error.

BRIEF SUMMARY

In one exemplary embodiment, a method of operating a device for a user is provided. The method includes operating the device in a first mode; receiving an indication of a first person in the presence of the user; retrieving a first profile associated with the first person; and operating the device in a second mode based, at least in part, on the first profile.

In another exemplary embodiment, a wireless device for a user is provided. The device includes a memory configured to store a first profile associated with the user and a second profile associated with a first person other than the user; and a controller coupled to the memory. The controller is configured to operate the device in a first mode based, at least in part, on the first profile, receive an indication of the first person in the presence of the user, retrieve the second profile upon receipt of the indication, and operate the device in a second mode based, at least in part, on the second profile.

In a further exemplary embodiment, an integrated circuit for a device of a user is provided. The integrated circuit includes a memory configured to store a first profile associated with the user and a second profile associated with a first person other than the user; and a controller coupled to the memory. The controller is configured to operate the device in a first mode based, at least in part, on the first profile, receive an indication of the first person in the presence of the user, retrieve the second profile upon receipt of the indication, and operate the device in a second mode based, at least in part, on the second profile.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments disclosed herein provide a wireless communications device that may receive an indication that a certain person is in the presence of the user. The wireless device may retrieve a profile associated with the other person and operate based, at least in part, on the settings in the profile. The wireless device may also adjust the profile based, at least in part, on settings received from a wireless device of the other person or on user activities.

Figure 1:
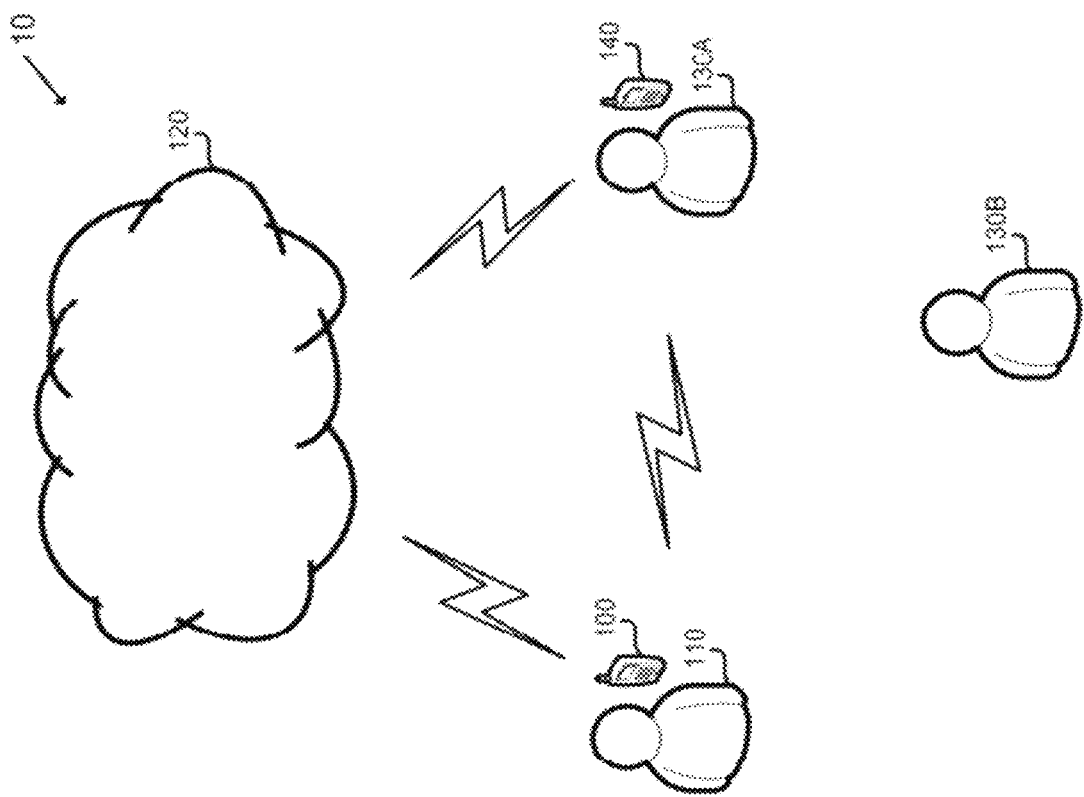
FIG. 1 is a block diagram of an environment of a wireless device in accordance with an exemplary embodiment.

FIG. 1 is a block diagram of an environment 10 of a wireless device 100 operated by a user 110 in accordance with an exemplary embodiment. Although exemplary embodiments are discussed below with reference to wireless devices, the systems and methods discussed herein are equally applicable to any type of device. In the illustrated exemplary embodiment, the environment 10 includes the wireless device 100 of a user 110 and further includes a network 120 and a number of other people 130 (e.g., 130A and 130B) that may be in the presence of the user 110. One or more of the other people 130 (e.g., person 130A) may have a wireless device 140 that interacts with wireless device 100 either directly or through the network 120, as discussed below. The other people 130 may be any person of interest in the presence of the user 110 who is not the user 110. Examples discussed below include the user's spouse and the user's boss, although the discussion below is applicable to any person of interest to the user 110. Generally, the phrase "in the presence" of the user 110 refers to any other person 130 in the same geographic location of the user 110 such that the user 110 and the other person 130 potentially have a personal interaction with one other, such as being located the same room or within a predetermined distance, such as 2 meters or some other distance. In one exemplary embodiment, this predetermined distance may be a set distance, while in other embodiments, the predetermined distance may be selected by the user 110.

The wireless device 100 may be, for example, a cellular phone, smart phone, MP3 player, iPod™ player, personal digital assistant (PDA), mobile handset, personal computer (PC), gaming device, television, radio, or the like. In the illustrated exemplary embodiment, the wireless device 100 is a cellular phone that exchanges information with the network 120 as well as other wireless devices, such as wireless device 140. The network 120 may be, for example, a wireless telecommunication network, the Internet, a public switched-phone network, and the like, and the type of information exchanged with the network 120 may include voice communication, digital data, SMS messaging, MMS messaging, Internet access, multi-media content access, voice over internet protocol (VoIP), and other conventional communication standards and protocols.

As described below, the wireless device 100 may include a profile associated with one or more of the other people 130 in the presence of the user 110. Upon identification of the other person 130, the wireless device 100 may operate in one of various modes based on the selected profile, for example, to adjust the ring volume of the wireless device 100 when the user 110 is in the presence of the other person 130.

Figure 2:
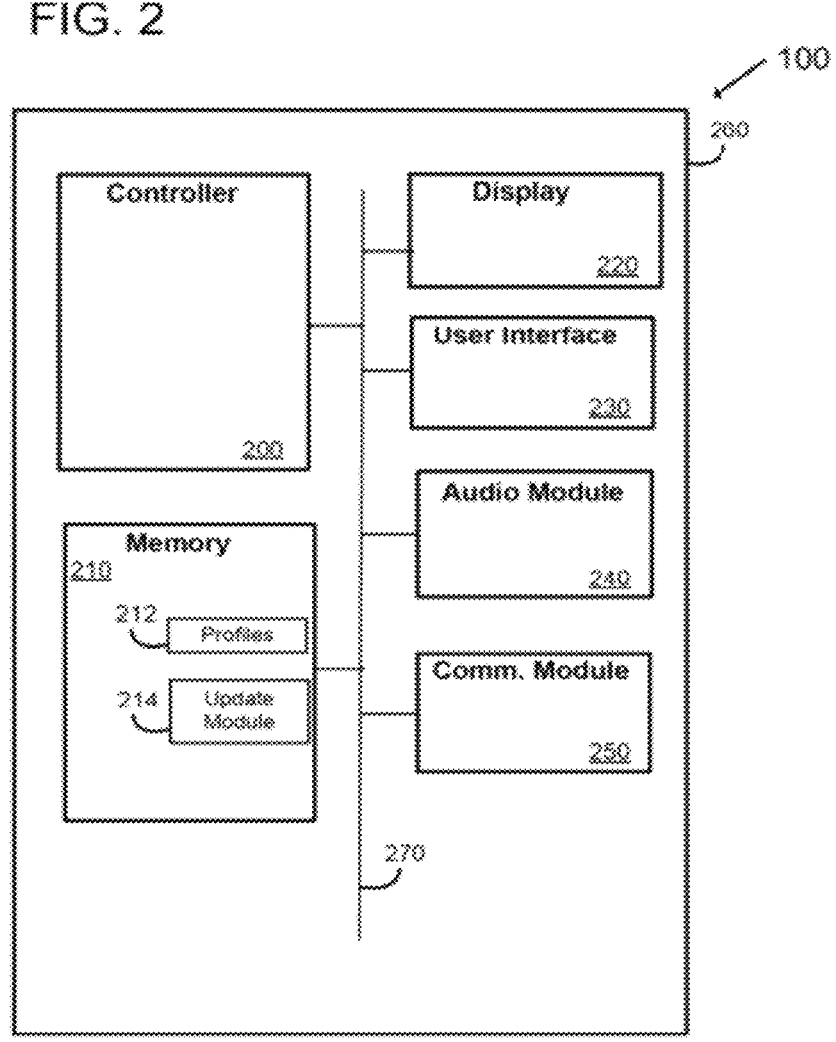
FIG. 2 is a more detailed block diagram of the wireless device of FIG. 1 in accordance with an exemplary embodiment.

FIG. 2 is a more detailed block diagram of the wireless device 100 of FIG. 1 in accordance with an exemplary embodiment. In one implementation, the wireless device 100 includes a controller 200, a memory 210, a display 220, a user interface 230, an audio module 240, and a communications module 250 positioned within or on a housing 260 and coupled together by a bus 270.

In general, the controller 200 controls the operation of the wireless device 100 in accordance with computer instructions stored in memory 210. The controller 200 may be implemented using a digital signal processor, microprocessor, microcontroller, programmable logic unit, discrete circuits, or a combination thereof. The memory 210 may include random access memory, read only memory, optical memory, or any other type of memory. The memory 210 may be arranged and configured to store information to be used by other components of the wireless device 100, including the controller 200, the display 220, the user interface 230, the audio module 240, and communications module 250. In one exemplary embodiment, the memory 210 stores profiles, represented in FIG. 2 as profile storage 212, that the controller 200 may use to control operation of the wireless device 100. The memory 210 may also include an update module 214 with a set of instructions for updating one or more of the profiles in profile storage 212. The profiles stored in the profile storage 212 and update module 214 will be discussed in greater detail below.

Although the controller 200 and memory 210 are illustrated within the wireless device 100, the processing and storage capabilities may be distributed and accessed from a network or external storage device. Depending on the embodiment, additional components may be provided or certain components omitted. The wireless device 100 may be assembled from discrete components, or implemented in one or more integrated circuits, or it may be assembled from a combination of discrete components and integrated circuit components.

As noted above, the wireless device 100 may be a communications device that supports various communication functions, including telephony, email, and web-browsing. As such, the controller 200 may control the wireless device 100 to transmit, receive, modulate, or demodulate communications to and from a network, including wide area networks (WAN), such as cellular networks, local area networks (LAN), personal area networks (PAN), or any other type of network, including the network 120 of FIG. 1. These functions may be facilitated by the audio module 240 and the communications module 250. The communications module 250 may include a transceiver, transmitter or receiver such that the wireless device 100 may communicate with the network 120 or other communication devices, such as wireless device 140 in FIG. 1. The audio module 240 may include a microphone, a speaker, a transducer, or any audio input and output circuitry for converting audible signals to and from digital signals. More particularly, the audio module 240 may receive audio information from the communications module 250 or memory 210, and the controller 200 or communications module 250 may process the audio information, such as by decoding and amplifying, to generate an audio signal that drives a transducer to produce audible signals that are based on the audio information. Similarly, the audio module 240 may receive audible signals from the user using a transducer that converts the audible signals to audio signals and process the signal for transmission via the communications module 250.

As introduced above, the wireless device 100 further includes a display 220 and a user interface 230. The display 220 may include an liquid crystal display (LCD) or other suitable device to display information to the user 110, while the user interface 230 may include a keyboard, keys, touchscreen input, or combination of input mechanisms for receiving and making telephone calls and supporting other interactions between the user 110 and wireless device 100. In some embodiments, the display 220 and user interface 230 may be combined, for example, in a touch screen display configured to receive user actuation with a digit of the user 110 or a stylus.

As noted above and discussed in greater detail below, the controller 200 may operate the wireless device 100 in one of various modes based on the presence of certain other people 130. Operation of the wireless device 100 is discussed in greater detail below with reference to FIG. 3.

Figure 3:
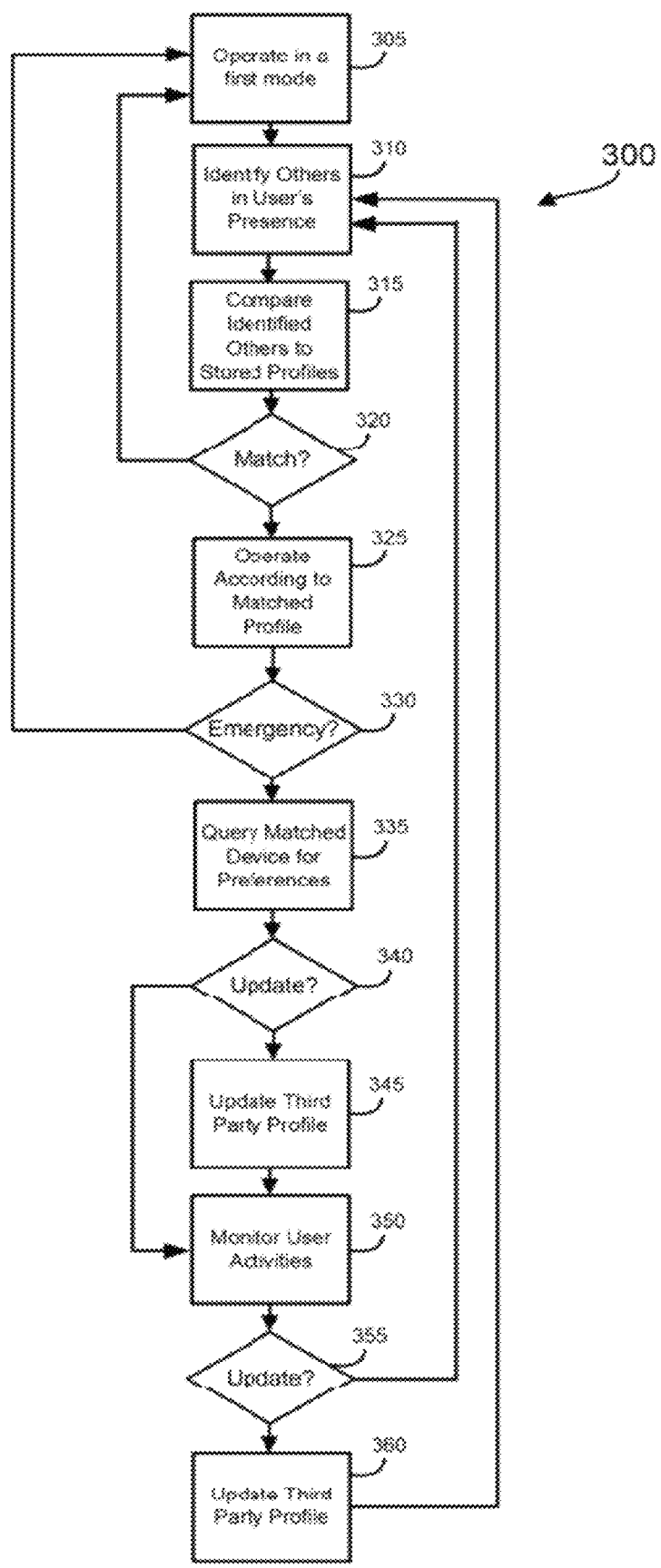
FIG. 3 is a flowchart of a method for operating a wireless device in accordance with an exemplary embodiment.

FIG. 3 is a flowchart of a method 300 for operating a wireless device 100 in accordance with an exemplary embodiment. In the description below, reference is additionally made to FIGS. 1 and 2 as well as FIG. 4, which illustrates profiles (e.g., user profile 410, profile 420, and profile 430) stored in the profile storage 212 of memory 210 of the wireless device 100. As discussed below, profiles 420 and 430 are associated with other people that the user 110 may interact with, such as other people 130.

Figure 4:
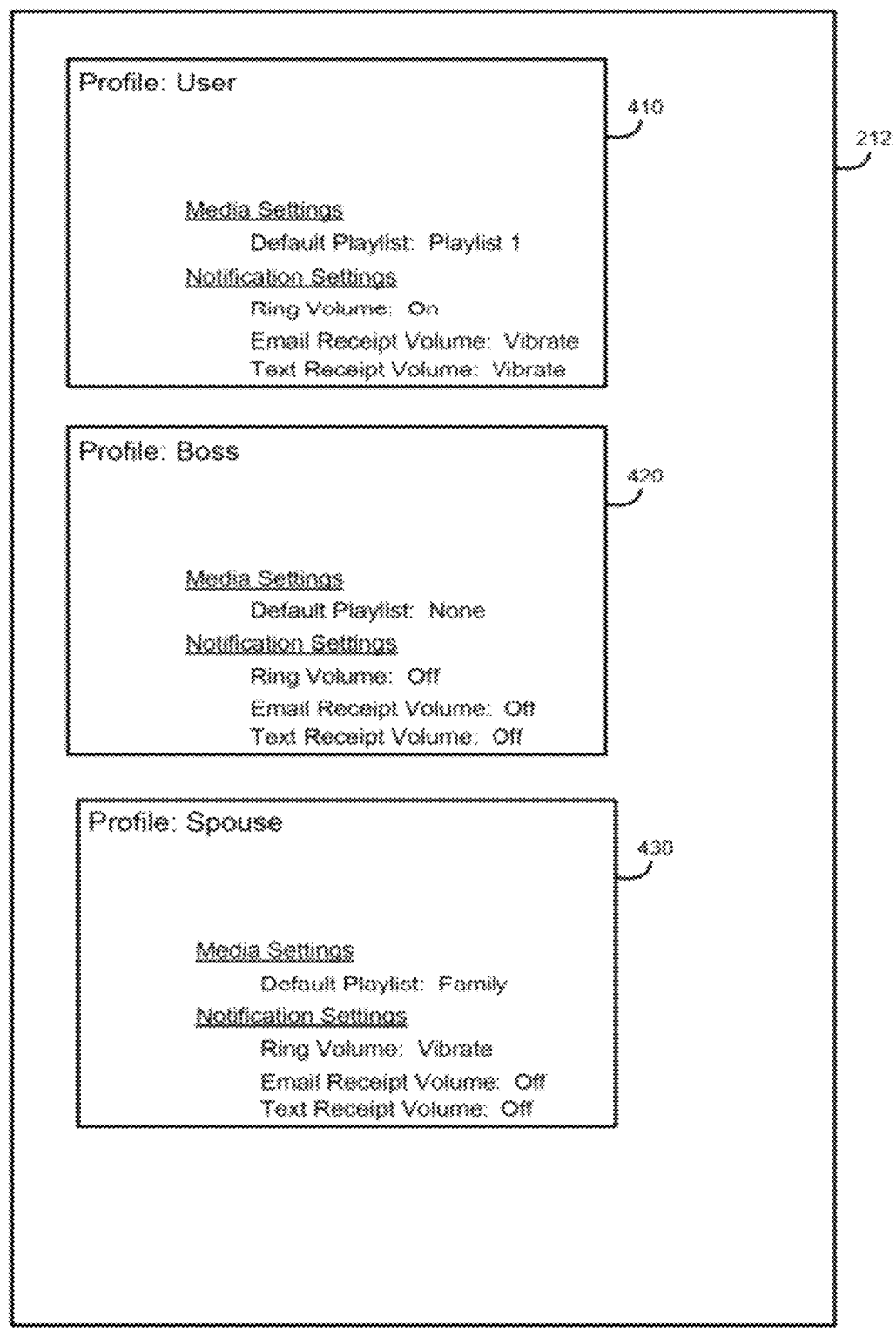
FIG. 4 is a block diagram of profiles associated with the wireless device of FIGS. 1 and 2 and the method of FIG. 3 in accordance with an exemplary embodiment.

In a first step 305, the wireless device 100 is operated in a first mode. The first mode is generally a default mode in which the wireless device 100 is operated in accordance with a user's profile, such as user profile 410 shown in FIG. 4. The user profile 410 may include any suitable operating parameters including media settings and notification settings. For example, the operating parameters associated with the user profile 410 may include ring volume and music playlist. As shown in FIG. 4, the user's media settings include a default playlist of "Playlist 1," a ring volume of "On," and email and text reception volumes of "Vibrate." As such, in this mode, when the wireless device 100 receives a phone call, the audio module 240 of the wireless device 100 will emit an audible sound. Similarly, when the wireless device 100 receives an email or text message, the user interface 230 will produce a vibration or other haptic response. Other operating parameters may include user interface preferences, volume rules, favorite television or radio settings, call forwarding settings, and the like. In other exemplary embodiments, operating parameters may include activation or deactivation of a password lock on the wireless device 100 or automatic user or social network notifications. In general, the user 110 may manually adjust the user profile 410 by creating or modifying any desirable setting using, for example, the user interface 230.

In step 310, the wireless device 100 receives an indication of another person 130 (e.g., person 130A or person 130B of FIG. 1) in the presence of the user 110. The other person 130 may be identified in a number of ways. For example, the user 110 may visually identify the other person 130 and provide a manual indication to the wireless device 100 of the presence of the other person 130. As noted above and shown in FIG. 4, the wireless device 100 may store or otherwise have access to a number of profiles 420 and 430 associated with other people 130. The profiles 420 and 430 may be stored as a list or associated with the contacts list of the user 110. As shown in the example of FIG. 4, the profiles 420 and 430 may be associated with the user's boss and spouse, respectively. As such, in one exemplary embodiment, the user 110 may select the appropriate profile 420 or 430 on the wireless device 100 upon identification of the other person 130. For example, when the user identifies his or her boss, the user 110 selects the profile 420 associated with the boss with the user interface 230.

In another embodiment, wireless device 100 may track or otherwise identify the location or geographical coordinates of the other people 130 that may be associated with one of the stored profiles 420 or 430. This may be implemented, for example, with GPS or other location reporting capabilities of the wireless device 140 of one of the other people 130. The wireless device 100 may similarly include location capabilities such as GPS functionality incorporated into the controller 200, memory 210, or communications module 250. Upon receipt of the location of the other wireless device 140, the wireless device 100 may then compare this location to the location of the user's wireless device 100. The result of this comparison indicates to the wireless device 100 that the other wireless device 140 (and, as such, the person 130A) is in the presence of the user 110. In a further embodiment, location tracking or presence notifications may be provided or otherwise supported by a network service provider through network 120 in which the wireless devices 100 and 140 update a centralized server with respective location coordinates and the server determines the distance between wireless devices 100 and 140 to appropriately inform the wireless device 100 when the wireless device 140 is at the same location.

In a further embodiment, the wireless device 100 may receive identification information directly from the other wireless device 140. For example, the wireless device 100 may receive a broadcast message from the wireless device 140 that identifies the other person 130A, or the wireless devices 100 and 140 may establish a short range communications link, such as a Bluetooth link, to provide the identifying information to the wireless device 100. For example, the wireless devices 100 and 140 may store and exchange unique Bluetooth address information to enable wireless identification and information exchange.

Upon identification of the other person 130, in step 315, the wireless device 100 compares the identity of the person 130 to the profiles stored in the memory 210, including profiles 420 and 430. If the one of the profiles 420 or 430 is associated with the identification information for the identified person 130 or the identified person's wireless device 140 in step 320, the method 300 proceeds to step 325 in which the wireless device 100 operates in a second mode according to the matched profile 420 or 430. In one exemplary embodiment, the adjustment in operation may be automatic, i.e., without further input from the user 110. In other embodiments, operation according to the matched profile may only occur after notification or confirmation of the user 110. Furthermore, the wireless device 100 may provide a notification to the user 110 indicating that the wireless device 100 is operating in the second mode, such as an indication on the display 220.

As described above, exemplary profiles 420 and 430 for operating the wireless device 100 in the second mode are shown in FIG. 4. For example, if the identified person 130 is the user's boss, the wireless device 100 operates according to profile 420. In this exemplary embodiment, the settings of profile 420 result in all notifications being turned off. In other words, the wireless device 100 is effectively silenced such that the user 110 is not interrupted with the user's boss. As another example, if the identified person 130 is the user's spouse, the wireless device 100 operates according to profile 430 in which a designated playlist is specified and the notification settings are adjusted. In this exemplary embodiment, the playlist may include songs suitable for the family and the notification settings may be adjusted for the family environment. In further embodiments, other operating parameters are adjusted in the second mode based on the profiles 420 or 430. For example, upon the appropriate setting of the selected profile 420 or 430, the wireless device 100 may enable a password lock, provide an audio or text notification to the user 110, or post a notification to a social network related to the presence of the identified person 130. If the wireless device 100 receives an indication that two other parties 130 are in the presence of the user 110, the wireless device 100 may be operated in accordance with the most conservative profile (e.g., one that favors silence over vibration and vibration over audible sounds), or the user 110 may designate one of the profiles 420 or 430 to take precedence. These profiles and scenarios are merely exemplary and any suitable profiles may be provided for any other person. The profiles 420 and 430 may be pre-established by the user 110 using the user interface 230 and adjusted or deleted as necessary or desired.

Referring again to method 300, the operation of the wireless device 100 according to profiles 420 and 430 may have certain exceptions, such as in the case of emergencies. For example, in step 330, communications from predetermined numbers or contacts may be associated with a designated signal on the wireless device 100 or place the wireless device 100 back in the default or first mode. In one example, a user that is a physician may specify to be audibly notified upon receipt of a telephone call from the hospital. If the wireless device 100 identifies such a communication, the method 300 returns to step 305 and the wireless device 100 is operated according to the user profile 410 in the first mode. In other embodiments, the wireless device 100 may notify the user 110 with a default signal such as audible ring, regardless of the user profile 410. In effect, this provides the wireless device 100 an override capability from operating according to a profile 420 or 430 in certain situations, although step 330 may be omitted.

If an emergency situation is not identified in step 330, the method 300 may proceed to step 335 in which the wireless device 100 may query a wireless device associated with the identified person 130, such as the wireless device 140 of person 130A in FIG. 1. Any suitable mechanism for communicating such a query and receiving a response may be provided, including through network 120. In one exemplary embodiment, the wireless device 100 may establish a short range wireless link with the wireless device 140, such as a Bluetooth link. Upon discovery and authentication of the wireless device 140, the wireless device 100 may receive profile information associated with person 130A that may be incorporated into one of the stored profiles 420 and 430. Like profiles 420 and 430, the profile information received from the wireless device 140 may include information such as media or notification settings. Accordingly, this profile information may correspond to the profile settings desired by the other person 130A. For example, a boss may request that all phones are to be silenced when he or she is in the presence of any user, including user 110, and the boss' wireless device, such as wireless device 140, may notify the wireless device 100 of the user 110 as such when the boss is in the presence of the user 110. As discussed above, step 335 may be facilitated by the communications module 250 of FIG. 2.

As such, in step 340 if profile information is received from the wireless device 140, the wireless device 100 may compare the received profile information to the stored profile 420 or 430. In step 340, the wireless device 100 may request confirmation from the user 110 to update the profile 420 or 430 with the received profile information. If the user 110 declines the changes to the profile 420 or 430 in step 340, the method 300 proceeds to step 350, which is discussed below. If the user 110 accepts the changes to the profile 420 or 430, the method 300 proceeds to step 345 in which the wireless device 100 adjusts the respective profile 420 or 430 according to the received profile information. In one exemplary embodiment, the update module 214 may include instructions for implementing the update of the appropriate profile 420 or 430. Steps 340 and 345 are discussed in the context of modifying the pre-existing profile 420 or 430 of an identified person 130. However, in other embodiments, steps 340 and 345 may be used to establish an initial profile for an identified person.

In step 350, the wireless device 100 may also monitor the action or activities of the user 110 when operating in the second mode. In one exemplary embodiment, such activities may be monitored to improve the profiles 420 and 430. For example, if the wireless device 100 is operating in the second mode according to the profile 430 (i.e., in the presence of a spouse), the wireless device 100 vibrates upon receipt of a telephone call, as reflected in FIG. 4 and discussed above. If, however, the user 110 continually silences the vibration notification upon receipt of telephone calls when operating according to the profile 430, the wireless device 100 may interpret this activity as the user 110 actually desiring to completely turn off this notification when in the presence of the other person 130. In another example, when operating in the second mode in accordance with the profile 430, the wireless device 100 may be playing songs in the family playlist, as reflected in FIG. 4 and discussed above. If, however, the user 110 skips certain songs in the playlist, the wireless device 100 may interpret this activity as indicating that these songs should be removed from the family playlist. In effect, the profiles 420 or 430 may "learn" optimized settings based on user behavior rather than the initially selected settings.

In one exemplary embodiment, activity monitoring and profile adjustment may be provided with algorithms or instructions stored as the update module 214 in memory 210. Any suitable instructions may be provided. For example, if an activity inconsistent with a setting occurs more than once or more than half the time, the wireless device 100 may prompt the user 110 about modifying the profile 420 or 430, as shown in step 355.

In step 355, the wireless device 100 may confirm that the user 110 desires to update the profile 420 or 430 with the observed activity. If the user 110 accepts the changes to the profile 420 or 430, the method 300 proceeds to step 360 in which the wireless device 100 adjusts the respective profile 420 or 430 according to the observed activity. After updating the profile 420 or 430 in step 360 or if the user declines the changes to the profile 420 or 430 in step 355, the method 300 returns to step 310 in which the wireless device 100 continues to wait for an indication of the people 130 in the presence of the user 110. In one exemplary embodiment, as long as the person 130 is identified in step 310, matches a stored profile 420 or 430 in step 320, and no emergencies occur in step 330, the wireless device 100 continues to operate in the second mode based on the matched profile 420 or 430. In another exemplary embodiment, the second mode may expire after a predetermined period of time, and the wireless device may revert back to operating in the first mode based on the user profile 410, as shown in step 305. In another embodiment, the user 110 may manually discontinue the second mode.

Accordingly, it will be appreciated that the exemplary embodiments discussed herein may provide a number of advantages. For example, the wireless devices operate according to profiles corresponding to other people in the presence of the user to prevent or reduce interruptions between the user and designated people of interest to the user.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of operating a device for a user, the method comprising:
   operating the device in a first mode;
   receiving an indication that a first person is in the presence of the user;
   retrieving a first profile associated with the first person; and
   operating the device in a second mode based, at least in part, on the first profile.

2. The method of claim 1 wherein receiving the indication includes receiving a manual input from the user identifying the first person.

3. The method of claim 2 wherein receiving the indication includes receiving a user selection from a contacts list.

4. The method of claim 1 wherein the device is a first device and wherein receiving the indication includes receiving a message originating from a second device associated with the first person identifying the first person.

5. The method of claim 1 further comprising monitoring a user action in the second mode and adjusting the first profile based, at least in part, on the user action.

6. The method of claim 5 wherein the user action in the second mode includes silencing an audio notification and wherein adjusting the first profile includes adjusting the first profile to prevent further audio notifications in the second mode.

7. The method of claim 5 wherein the device is a media device configured to play a plurality of songs from a playlist, wherein the user action in the second mode includes skipping a first song in the playlist, and wherein adjusting the first profile includes removing the first song from the playlist in the second mode.

8. The method of claim 1 wherein the device is a first device, wherein the first person has a second device, and wherein the method further includes receiving settings from the second device and adjusting the first profile based, at least in part, on the settings.

9. The method of claim 1 wherein the device is a first device, wherein the first person has a second device, and wherein the method further includes requesting settings for the first profile from the second device.

10. The method of claim 1 wherein the first profile includes at least one of a playlist, audio settings, and notification settings.

11. The method of claim 1 further comprising interrupting the second mode upon receipt of a communication from a predetermined contact.

12. A device for a user, the device comprising:
   a memory configured to store a first profile associated with the user and a second profile associated with a first person other than the user; and
   a controller coupled to the memory and configured to:
      operate the device in a first mode based, at least in part, on the first profile;
      receive an indication that the first person is in the presence of the user;
      retrieve the second profile upon receipt of the indication; and
      operate the device in a second mode based, at least in part, on the second profile.

13. The device of claim 12 further comprising a user interface coupled to the controller and configured to receive the indication as a manual input from the user identifying the first person.

14. The device of claim 12 further comprising a communications module coupled to the controller and configured to receive a message with the indication of the first person originating from another device associated with the first person.

15. The device of claim 12 wherein the controller is further configured to monitor a user action in the second mode and to adjust the second profile based, at least in part, on the user action.

16. The device of claim 12 wherein the controller is further configured to receive profile settings from another device associated with the first person and to adjust the second profile based, at least in part, on the profile settings.

17. The device of claim 12 wherein the second profile includes at least one of a playlist, audio settings, or notification settings.

* * * * *